Sept. 26, 1972  C. W. PIERCE  3,694,220

INFRARED RADIATION OF SEED

Filed Sept. 2, 1969

INVENTOR:
CHARDO W. PIECE
BY:

United States Patent Office 3,694,220
Patented Sept. 26, 1972

3,694,220
INFRARED RADIATION OF SEED
Chardo W. Pierce, Lubbock, Tex., assignor to Chardo Pierce Micronizing Company, Amarillo, Tex.
Continuation-in-part of application Ser. No. 576,353, Aug. 31, 1966. This application Sept. 2, 1969, Ser. No. 854,693
Int. Cl. A23k 1/00; A23l 1/18
U.S. Cl. 99—2                                    8 Claims

ABSTRACT OF THE DISCLOSURE

Seeds from grain or legumes are prepared for animal or human consumption by first heating with infrared radiation until soft, turgid, malleable and plastic. Then the seed are extruded by a roll to form a wafer or flake from each seed, which wafer or flake is suitable for storage and is readily digestible.

CROSS-REFERENCE TO RELATED APPLICATIONS

This is a continuation-in-part of my prior application entitled Feed Grain Cooker, filed Aug. 31, 1966, Ser. No. 576,353, presently pending in Group 182.

BACKGROUND OF THE INVENTION

(1) Field of the invention

This invention relates to the processing of food by infrared heating and then rolling whole seed.

(2) Description of the prior art

It is known that seed from grains and legumes are better utilized by cattle as well as humans if they are prepared. This is particularly true of certain hard grains such as grain sorghum or milo. Commercially this preparation often includes steaming or wet cooking as well as cracking.

It has been suggested that grain be steamed, then popped and then rolled, Reckon 3,173,794.

In popping corn for human consumption, it has been suggested that the corn be popped on a tilted, vibrated plate with an electrical resistance heater in the plate, Hale 1,839,671.

Also, it has been suggested that corn be popped by using infrared heaters, Hill 3,180,247.

SUMMARY OF THE INVENTION

According to this invention, the seed is placed dry, with no prior treating except cleaning, upon a tilted, vibrating plate. Upon this plate, the seed are heated by gas-fired infrared heaters for about 25 seconds. The seed are not everted or popped. Less than 1% of the grains might pop as an indicator that the remaining grains are soft, malleable, turgid, and plastic, and ready to be extruded by rollers. The heated seed are dropped into the rollers where they are flaked, extruded, or flattened by the rollers. The resulting wafers are more digestable than untreated seed and the finished product may be stored without becoming rancid or otherwise oxidizing. Although the bulk is increased slightly, the bulk has not been increased to a point where a storage problem is created. The wafers are sturdy enough not to be crushed in storage or in hauling.

An object of this invention is to prepare seed for consumption.

Another object of this invention is to convert grain and legume seeds into better cattle feed.

Other objects are to provide a product which is palatable, nutritious, is not subject to rancidity or staleness in storage, will withstand crumbling in storage and in hauling, and is readily digested and utilized.

Further objects are to achieve the above with a method that is safe, rapid, efficient, versatile, and inexpensive, and does not require skilled people to install, adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 1:
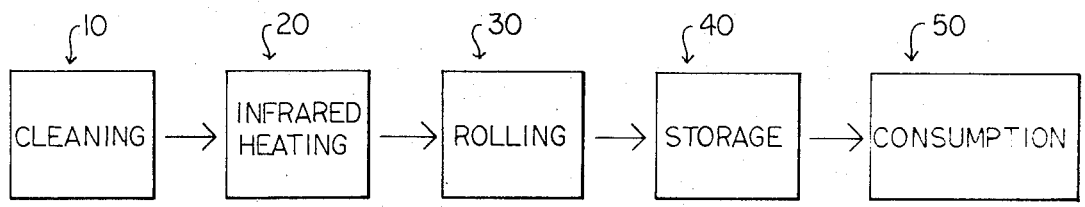
FIG. 1 is a block representation of the steps taken according to this invention.
Figure 2:
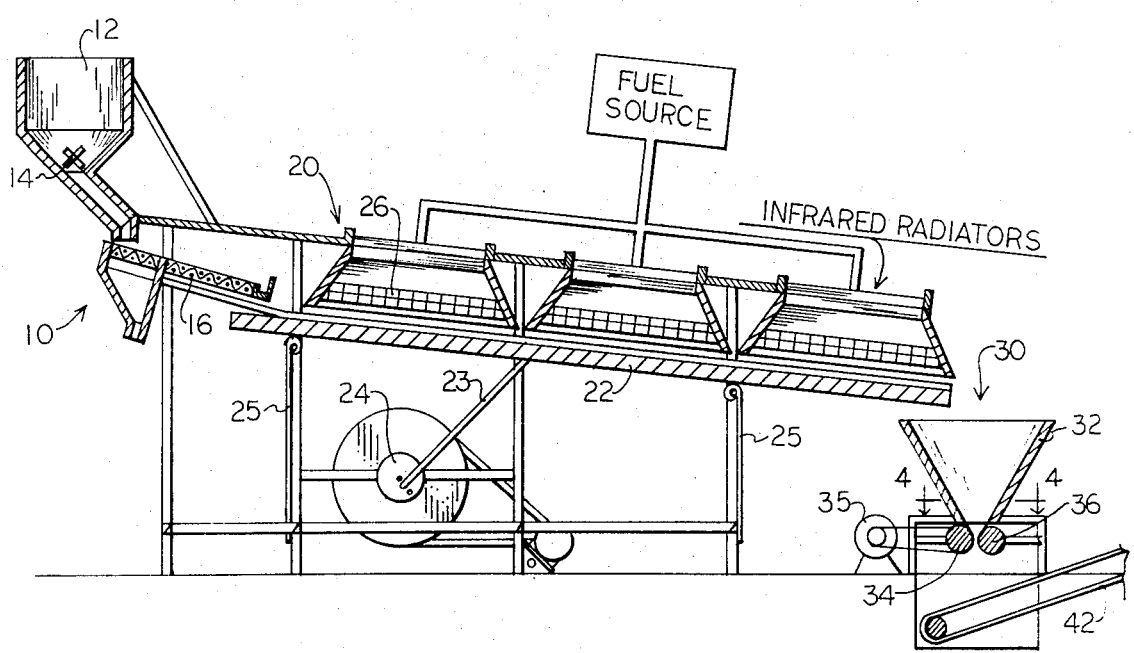
FIG. 2 is a sectional view, somewhat schematic, of the equipment used for this invention.

Referring specifically to the drawing, FIG. 1 shows the general flow diagram of this process. The first step is cleaning by cleaner 10. The seed are cleaned by screening.

After screen-cleaning, the next step is to heat the seed for about 20 to 30 seconds with infrared radiators 20. I have found that if about a thousand pounds of seed are being treated an hour, about 500 cubic feet of natural gas per hour is required. Since natural gas has a heating value of 1000 B.t.u. per cubic foot, this is about 500 B.t.u. used in the infrared heaters for each pound of seed. In the heating process, there is no drying or parching of the seed. The coating on the seed seals the seed so there is no apparent loss of moisture.

When the interior of the seeds reach a soft, plastic, turgid and malleable state, the seed are fed directly from the heater 20 to roller 30 where each seed is flattened or flaked or formed into a wafer. The interior of each seed is almost of dough-like quality so that it forms a sturdy wafer or flake. If the seed have not been properly heated, they tend to crack or crumble. The seeds tend to crack and crumble if either they have not been heated enough or if they have been heated too much.

After the rolling process, the feed is adaptable for storage in bins 40 with no further processing. The bulk is increased by about 30% to 50%. However, this increase in bulk is not sufficient to increase storage space to an uncommercial extent and the feed may be stored for a period of days, weeks, months, or until its ultimate consumption represented by block 50.

I have found this process is adaptable for the common cereal grains such as corn, wheat, rye, barley and sorghum. Inasmuch as grain sorghum has great commercial use and is not as adaptable to untreated feeding for cattle, grain sorghum is the grain described herein. I have found that this process is quite useful for legumes such as soy beans, navy beans, English peas or pinto beans.

The amount of time the seed are exposed to the infrared radiant heat will depend upon the kind and variety of seed processed and, also, it will depend upon the conditions under which the seed grew. No two batches of seed will require the same exposure time. Even considering the same varities of grain sorghums, I have found that some take more and some take less time, although in general the exposure to the infrared radiation for 20 to 30 seconds is a good average. The only way I have discovered to determine how long any particular batch of seed should be processed is to try some of the seed and adjust accordingly. If the seed cracked or crumbled when they come from the roller 30, they are not in proper condition to be fed thereto. I estimate the seed are about 325° F. after heating, although I have not been able to measure the temperature. With grain sorghums and other seed which evert or pop, to pop a few seed is a useful indication of proper control. When properly controlled, a few seed will pop just before they reach the rolls, showing that the remainder of the seed are in the soft, plastic, turgid and malleable state to be rolled to form a proper flake or wafer. By a few seed, I mean less than one-half of one percent. Again it is emphasized that if the seed are heated until they are parched or dry, they wil not be of proper soft, turgid, malleable, plastic condition to be extruded or flaked or wafered in the rolls.

The equipment used for heating the seed can be identical to that shown in my prior application noted above. Feeding bin 12 with kicker 14 feeds the seed onto screen 16 where the seed are cleaned by screening as is well known to the art. Air cleaning may be used.

From the cleaning screen 16, the seed are fed onto metal plate 22, which is vibrated by pitman 23 connected to motor-driven eccentric or crank 24. The metal plate 22 is supported by leaf-springs 25. The plate, about 12 feet long and 2 feet wide to handle 1000 pounds of grain per hour, is tilted so that the seed as vibrated move from the screen-cleaner 10 to the rolling stage 30. A black, iron plate ½ inch thick is well suited to form the plate 22. Infrared radiators 26 are positioned over the plate and gas-fired infrared radiators, as disclosed in U.S. Pat. 2,775,294, are well adapted for this purpose. They produce a wave length of 2½ to 3 microns. Such gas-fired infrared radiators are commercially available on the market. It is desirable to place the radiators 26 only four to seven inches above the plate 22 for better heat transfer.

If the seed are radiated more intensely for a shorter time, difficulty is experienced in obtaining uniform heating of the seed. Normally the seed are heated as fast as possible for economic reasons. Also, extended heating times would probably produce the undesirable result of loss of moisture through the seed coating.

Figure 3:
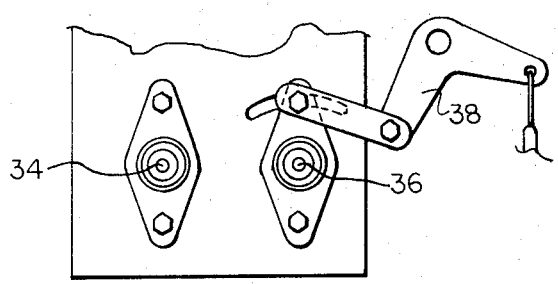
FIG. 3 is a partial elevational view showing adjustment of the roll gearings.
Figure 4:
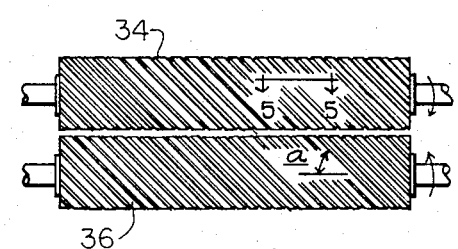
FIG. 4 is a top plan view of the rolls taken substantially on line 4—4 of FIG. 2.
Figure 5:
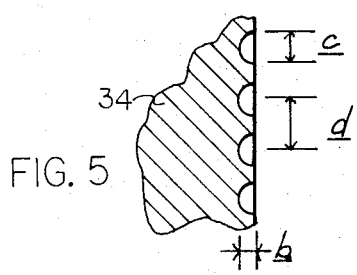
FIG. 5 is a sectional view showing details of the serration without grooves in the roll taken on line 5—5 of FIG. 4.

After the seed are heat treated, they drop directly from the end of plate 22 into the roller 30. The roller has a funnel or chute 32 leading to the rolls 34 and 36. As seen (FIG. 3), the bearing for the roll 34 is fixed to the housing, but the bearing for the roll 36 is adjustably mounted by linkage 38 so that the distance between the rolls may be adjusted. I have found that for different kinds and varieties of seed and for different conditions of the seed, it is desirable to adjust the rolls accordingly. In general, I have found that when the rolls are set spaced apart between .015 and .03 inch, it is satisfactory. In all cases I have found that the thickness of the wafer at the roll should be no greater than about .05 inch. There also is a correlation between the spacing of the roll and the heating of the seed. I believe that there is a change in the seed in addition to flattening the seed as they pass through the rolls. Certainly the seed coat is broken. Also the cellulose-like membrane encapsulating the starch granule is ruptured, making the starch easier to digest. Hydrolyzation occurs, converting starch to dextrose and protein to amino acids. If the seed are allowed to cool after infrared radiation and before rolling, the beneficial results from the hydrolyzation do not appear to occur. Heating by other means rather than infrared radiation does not appear to produce desirable results as described. This is believed because the water content of the seed has a higher affinity for infrared radiation than the starch content or the protein content. The resistance to rancidity is believed to be the result of destruction of certain enzymes which are not destroyed by other types of heating.

I have noted that white grain varieties of grain sorghum heat faster than yellow grain varieties which heat faster than red grain varieties. I am uncertain if this is because of the difference in color or the differences in composition inherent in different varieties manifested by grain color.

There is some release of moisture at the time the cover is broken and each seed is flattened. The release of moisture is in the form of super-heated steam. Typically, sorghum will lose 6% to 8% weight in rolling. A hood and chimney (not shown) over the rolls 30 are desirable to carry the moisture away. The finished wafer will have about 8% moisture content of the entering seed. Also, I believe that the nutrients of the seed are converted or transformed into a more efficient feed for the animal. I do not known the nature, but I believe that this is part of the changes that take place in the seed so that the seed is more digestible, better utilized by the animal. The rolls should be adjusted for the kind and variety of seed and its state of softness so that a sturdy flake or wafer is formed.

As stated, the seed are more extruded in the rolls than flattened. Also, the rolls are serated or grooved and these grooves are serrations are in a helical pattern. The helical angle $a$ of the grooves is about 20° to 30°. The helical angle is in the same direction on each roll; therefore, a cross or waffle pattern is produced on the wafer. These depressions in the rolls have a depth $b$ of about .015 inch and a width $c$ of about .04 inch and a spacing $d$ of about .1 inch on center. The rollers are flat between grooves. No difficulty has been experienced with the grain sticking to the rolls. The rolls are driven by electric motor 35.

After the seed are rolled flat in the rolls 30, each seed puffs or rises slightly. During this rising step, the seed will absorb additives such as vitamins or protein supplements. Thus other food elements, such as vitamins or protein supplements, may be added to the seed after radiation and before rolling. Some varieties of sorghum seed will rise to .125 inch thickness after having been rolled to .02 inch thickness, although most varieties do not rise this much. Legumes will generally be rolled thicker than grains and will rise more. After rolling and rising, grain sorghums will have a density of between 35 to 37 pounds per bushel. This density is about the same for all varieties.

Besides grains and legumes, other seed, e.g., cottonseed, commonly used by humans or animals for food may be processed by this method.

After the seed have been flaked by the rolls, they are dropped onto conveyor 42 where they are conveyed to the storage bin 40.

Thus it may be seen that I have provided an efficient method of preparing a superior feed for consumption, which method is well adapted for automated operation.

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim:

1. The method of preparing seed or the like for consumption comprising the following steps:
    (a) cleaning the seed,
    (b) radiating the seed with infrared radiation to rapidly raise the seed to a high temperature, (c) controlling the radiation of the seed by permitting popping of less than ½ of 1% of the seed immediately prior to entering the rolls whereby the seeds are soft, turgid, malleable and plastic, (d) permitting only about 20 to 30 seconds to elapse between the time the seed begin to be radiated until the seed enter the roll, (d') subsequently immediately roll corrugating the seed while hot, thereby flaking each seed to produce cross-grooved flakes, and (e) subsequently immediately allowing said rolled and heated flakes to puff slightly.

2. The method of claim 1 and wherein:
(f) said processing is controlled to increase the bulk from about 30 to about 50 percent.

3. The method of claim 1 and wherein:
(f) said processing is controlled to produce a seed flake having a moisture content of about 8%.

4. The method of claim 1 and wherein:
(f) said grain seed is grain sorghums, and
(g) said processing is controlled to produce grain sorghum having a density of between about 35 and about 37 pounds per bushel.

5. The method of claim 1 and wherein:
(f) said grain seed is grain sorghum,
(g) said rolling being about .02 inch thickness, and
(h) said puffing being about .125 inch thickness.

6. The method of claim 1 and wherein:
(f) said heating utilizes about 500 B.t.u. per pound of seed.

7. The method of claim 1 and wherein:
(f) said rolling step is a flattening and extruding step.

8. The method of claim 1 and wherein:
(f) the seed is agitated as it is being rapidly radiated.

References Cited
UNITED STATES PATENTS

| | | | |
|---|---|---|---|
| 1,839,671 | 1/1932 | Hale | 99—238.1 |
| 2,428,090 | 9/1947 | Naeher et al. | 99—217 |
| 2,898,210 | 8/1959 | Dale et al. | 99—81 |
| 3,084,620 | 4/1963 | Gibbons | 99—2 |
| 3,141,777 | 7/1964 | Guidarelli | 99—217 |
| 3,173,794 | 3/1965 | Reckon | 99—81 |
| 3,180,247 | 4/1965 | Hill | 99—238.5 |
| 3,336,137 | 8/1967 | Hickey | 99—2 |
| 3,343,961 | 9/1967 | Truax | 99—2 |
| 3,471,298 | 10/1969 | Hirahara | 99—2 |

NORMAN YUDKOFF, Primary Examiner

H. H. BERNSTEIN, Assistant Examiner

U.S. Cl. X.R.

99—811